United States Patent
Chen et al.

(10) Patent No.: US 10,588,016 B2
(45) Date of Patent: Mar. 10, 2020

(54) ADAPTER FOR PROVIDING UNIFIED TRANSACTION INTERFACE

(71) Applicant: Visa International Service Association, San Francisco, CA (US)

(72) Inventors: Yuexi Chen, Foster City, CA (US); Marc Kekicheff, Foster City, CA (US); Philippe Martin, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 133 days.

(21) Appl. No.: 15/631,716

(22) Filed: Jun. 23, 2017

(65) Prior Publication Data

US 2018/0376333 A1 Dec. 27, 2018

(51) Int. Cl.
| | |
|---|---|
| H04L 29/06 | (2006.01) |
| H04W 12/06 | (2009.01) |
| G06F 9/46 | (2006.01) |
| H04W 8/00 | (2009.01) |
| H04W 4/80 | (2018.01) |
| G06F 16/20 | (2019.01) |

(Continued)

(52) U.S. Cl.
CPC .......... *H04W 12/06* (2013.01); *G06F 9/466* (2013.01); *G06F 16/20* (2019.01); *H04L 63/16* (2013.01); *H04L 67/2861* (2013.01); *H04L 69/08* (2013.01); *H04W 4/18* (2013.01); *H04W 4/80* (2018.02); *H04W 8/005* (2013.01); *H04W 12/00407* (2019.01); *H04W 12/08* (2013.01); *H04W 88/06* (2013.01)

(58) Field of Classification Search
CPC ....... H04W 12/06; H04W 4/80; H04W 8/005; H04W 88/06; G06F 9/466; G06F 17/30286; H04L 63/16
See application file for complete search history.

(56) References Cited

U.S. PATENT DOCUMENTS

| | | | | |
|---|---|---|---|---|
| 2004/0143512 | A1* | 7/2004 | Sturr, Jr. ............... | G06Q 20/20 705/26.8 |
| 2008/0283592 | A1* | 11/2008 | Oder, II ................ | G06Q 20/20 235/380 |

(Continued)

OTHER PUBLICATIONS

International Search Report and Written Opinion, dated Oct. 2, 2018, in PCT Application No. PCT/US2018/038800, 17 pages.

*Primary Examiner* — Viet D Vu
(74) *Attorney, Agent, or Firm* — Kilpatrick Townsend & Stockton LLP

(57) ABSTRACT

Embodiments of the invention are directed to enabling access transaction systems to accept different communication protocols. In some embodiment, an access device receives, from a portable device, an indication that a transaction is to be performed by exchanging transaction information between the portable device and a remote computer, wherein the remote computer is configured to communicate using a first communication protocol. Next, the access device determines that the portable device is configured to communicate using a second communication protocol. The access device then converts communications between the portable device and the remote computer from the second communication protocol to the first communication protocol to assist the portable device and the remote computer in exchanging the transaction information.

20 Claims, 6 Drawing Sheets

(51) Int. Cl.
*H04L 29/08* (2006.01)
*H04W 12/08* (2009.01)
*H04W 4/18* (2009.01)
*H04W 12/00* (2009.01)
*H04W 88/06* (2009.01)

(56) References Cited

U.S. PATENT DOCUMENTS

| | | |
|---|---|---|
| 2012/0221468 A1 | 8/2012 | Kumnick et al. |
| 2013/0137430 A1 | 5/2013 | Coppinger et al. |
| 2013/0254110 A1 | 9/2013 | Royyuru et al. |
| 2014/0108250 A1 | 4/2014 | Balasubramanian et al. |
| 2014/0222599 A1* | 8/2014 | Wang ............... G06Q 20/027 705/21 |
| 2015/0026049 A1 | 1/2015 | Theurer et al. |
| 2015/0193765 A1* | 7/2015 | Gadotti ............ G06Q 20/3276 705/39 |
| 2015/0319161 A1* | 11/2015 | Dimmick ........... H04L 63/0823 726/4 |
| 2016/0110752 A1* | 4/2016 | Parento ............ G06Q 30/0226 705/14.27 |
| 2016/0307195 A1* | 10/2016 | Cantwell ............ G06Q 20/401 |

* cited by examiner

ADAPTER FOR PROVIDING UNIFIED TRANSACTION INTERFACE

BACKGROUND

Within the context of conducting an access transaction (e.g., a transaction for accessing a building, a transaction for accessing data inside of a computer, a payment transaction) with a portable device (e.g., a contact chip card, an NFC enabled phone, a contactless credit card) and an access terminal (e.g., a chip terminal, a contactless terminal) at a resource provider (e.g., a secured building, a merchant), multiple communication protocols for conducting the transaction may exist. Communication protocols may be defined by various characteristics. Some protocols may be stateless while others may be stateful. Some protocols may specify a particular ordered sequence of commands or communications that are to be exchanged between a portable device and an access terminal in order to conduct the transaction.

Because of such characteristics, communication protocols may not be compatible with one another. In particular, a portable device that is configured to use one communication protocol may be unable to perform a transaction with an access terminal that is configured to use a different communication protocol. In an example where a customer intends to use a credit card to purchase an item at a checkout line of a store, the credit card may turn out to be unusable at the store if the credit card relies on a stateful communication protocol while the access terminal is configured to communicate in a stateless fashion. As a result, either the customer is forced to rely on a different method of payment (e.g., cash, check, or another type of credit card) or the store is forced to purchase and maintain another type of access terminal Embodiments of the present invention address these problems and other problems individually and collectively.

BRIEF SUMMARY

Embodiments of the invention are directed to techniques for enabling access terminals and other types of access transaction systems to work with different communication protocols. Techniques may include receiving, by an access device from a portable device, an indication that a transaction is to be performed between the portable device and a remote computer (e.g., a remote transaction processor). As one example, a customer may be attempting to purchase a physical item from a brick-and-mortar store by swiping her credit card against a card reader, where the card reader is communicatively coupled to a payment acceptance (PA) service that is accessible through the cloud (i.e., a PA in the cloud). In this regard, the purchase of the item may correspond to the transaction, the credit card may correspond to the portable device, the swiping of the credit card may correspond to the indication of the transaction, the card reader may correspond to the access device, and the PA in the cloud may be provided by the remote computer.

In some embodiments, to provide the PA in the cloud, the remote computer may host a transaction processing module that has functions, logic, or data used for handling contact or contactless transactions initiated by portable devices interacting with access devices. The remote computer may be configured to communicate using a first communication protocol. For example, the PA in the cloud may be exposed as a Representational State Transfer (REST) service or a JavaScript Object Notation (JSON) service, where messages formatted in Extensible Markup Language (XML) or JSON are exchanged over the first communication protocol.

Next, the access device determines that the portable device is configured to communicate using a second communication protocol. For example, the portable device may be exposed as a stateful service, where messages formatted as Integrated Circuit Cards commands (e.g. compliant to ISO 7816) are exchanged over the second communication protocol. Note that the terms "first," "second" and the like are not restrictive, but can used as labels to represent different devices or objects.

As such, the access device may play the role of an interpreter that enables the portable device, which communicates in a second communication protocol, to exchange transaction information with the remote computer, which communicates in the first communication protocol. To do so, the access device may convert communications between the portable device and the remote computer from the second communication protocol to the first communication protocol to assist the portable device and the remote computer in exchanging the transaction information.

Other embodiments are directed to systems, access devices, computer servers, portable communication devices, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
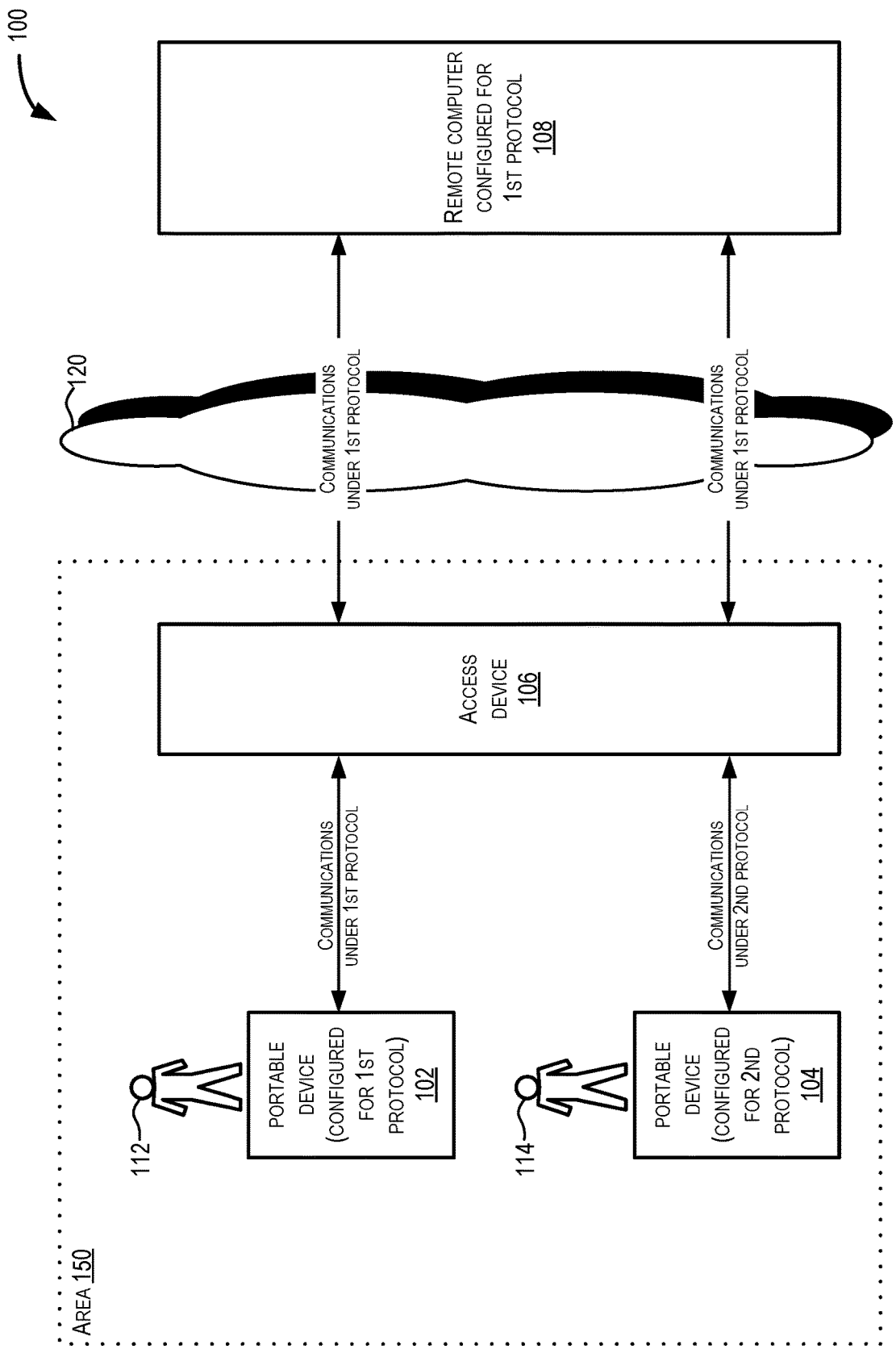
FIG. 1 shows a block diagram of a system for conducting access transactions using different communication protocols in accordance with some embodiments.

Embodiments of the invention are directed to techniques for enabling access terminals and other types of access transaction systems to work with different communication protocols. Techniques may include receiving, by an access device from a portable device, an indication that a transaction is to be performed between the portable device and a remote computer. As one example, a customer may be attempting to purchase a physical item from a brick-and-mortar store by swiping her credit card against a card reader, where the card reader is communicatively coupled to a payment acceptance (PA) service that is accessible through the cloud (i.e., a PA in the cloud). In this regard, the purchase of the item may correspond to the transaction, the credit card may correspond to the portable device, the swiping of the credit card may correspond to the indication of the transaction, the card reader may correspond to the access device, and the PA in the cloud may be provided by the remote computer.

In some embodiments, to provide the PA in the cloud, the remote computer may host a transaction processing module that has functions, logic, or data used for handling contact or contactless transactions initiated by portable devices interacting with access devices. The remote computer may be configured to communicate using a first communication protocol. For example, the PA in the cloud may be exposed as a Representational State Transfer (REST) service or a JavaScript Object Notation (JSON) service, where messages formatted in Extensible Markup Language (XML) or JSON are exchanged over the first communication protocol.

Next, the access device determines that the portable device is configured to communicate using a second communication protocol. Note that the terms "first," "second" and the like are not restrictive, but can used as labels to represent different devices or objects. Returning to the above example, the credit card may be configured to communicate with the card reader over near-field communication (NFC), where messages adopt a format that is more compact such as Integrated Circuit Cards commands (e.g. compliant to ISO 7816).

As such, the access device may play the role of an interpreter that enables the portable device, which communicates in a second communication protocol, to exchange transaction information with the remote computer, which communicates in the first communication protocol. To do so, the access device may convert communications between the portable device and the remote computer from the second communication protocol to the first communication protocol to assist the portable device and the remote computer in exchanging the transaction information.

In some embodiments, the access device may be configured to determine whether a portable device is configured to communicate using the first communication protocol or the second communication protocol. If the portable device is configured to communicate using the first communication protocol (e.g., if the credit card is a newer type of credit card), the access devices may not perform as many conversion operations to forward communications from the portable device to the remote computer as it would if the portable device was configured to communicate using the second protocol (e.g., if the credit card is an older type of credit card). In doing so, the access device may enable the remote computer (e.g., the PA in the cloud) to perform transactions with a larger variety of portable devices.

Prior to discussing embodiments of the invention, some terms will be described.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

I. System Providing a Unified Transaction Interface

FIG. 1 shows a block diagram of a system including users 112-114, portable devices 102-104, an access device 106, a remote computer 108, and a communication network 120. The users 112-114, the portable devices 102-104, and the access device 106 are depicted to be located within an area 150. The portable device 102 and the remote computer 108 may be configured to communicate using a first communication protocol while portable device 104 may be configured to communicate using a second communication protocol. The portable devices 102 and 104 exchange communications with the access device 106, which in turn exchanges communications with the remote computer 108 over the communication network 120. In particular, the access device 106 may serve as an interpreting relay that enables a portable device (e.g., the portable device 102 or the portable device 104) to exchange transaction information with the remote computer 108 during a transaction.

In one example, the users 112-114 may be customers that are attempting to buy something at a brick-and-mortar store, the portable device 102 may be a newer type of credit card that is being carried by the user 112, the portable device 104 may be an older type of credit card that is being carried by the user 114, the access device 106 may be a card reading device that is located in the store building, the communications network may be the Internet, the remote computer 108 may provide a PA in the cloud. In this example, the user 112 may use the portable device 102 to conduct a first transaction with the access device 106 and the remote computer 108 while the user 114 may use the portable device 104 to conduct a second transaction with the access device 106 and the remote computer 108.

When a transaction is initiated between the portable device 102 and the access device 106, the portable device 102 and the remote computer 108 may attempt to exchange transaction information. In some embodiments, the PA in the cloud may seek to obtain payment account details from the portable device 102 while the portable device 102 may seek to obtain transaction data (e.g., terminal transaction qualifies, language preference, transaction currency code, etc.) from the PA in the cloud. To free the remote computer 108 from having to deal with other communication protocols other than the first communication protocol, embodiments may configure the access device 106 to serve as a communication conversion or abstraction module, where the access device 106 intercepts, screens, converts, and/or filters communications between the remote computer 108 and any portable device that is attempting to perform a transaction with the remote computer 108.

Communication protocols between the access device 106 and the portable device 102 may depend on their respective capabilities (e.g., what protocol do they have in common, e.g. contact, contactless, NFC, Bluetooth, Wi-Fi, QR code, etc.) Embodiments may configure the access device 106 to serve as a communication conversion or abstraction module that shields the remote computer 108 from supporting multiple communication protocols, where there is one conversion/abstraction module for each type of portable device 102.

In particular, the access device 106 may be capable of communicating using different communication protocols (e.g., both the first communication protocol and the second communication protocol). When receiving, from a portable device, communications under a communication protocol that is incompatible with the remote computer 108 (e.g., the second communication protocol), the access device 106 may convert the received communications to be compatible with the remote computer 108 (e.g., to adhere to the first communication protocol) and forward the converted communications. Likewise, when receiving communications from the remote computer 108, the access device 106 may convert the communications to the communication protocol that is incompatible with the remote computer 108 before forwarding the converted communication to the portable device.

Returning to the above example, the user 114 may initiate a contact transaction by inserting the portable device 104 into the access device 106 so that communications under the first communication protocol may be exchanged between the portable device 104 and the access device 106. As communications under the second communication protocol are exchanged between the portable device 104 and the access device 106, the access device 106 may convert communications received from the portable device 104 to the first communication protocol and transmit the converted communications to the remote computer 108. The remote computer 108 may generate responses to the converted communications and sends those responses in the form of communications under the first communication protocol to the access device 106. In response, the access device 106 may convert communications received from the remote computer 108 to the second communication protocol and transmit the converted communications to the portable device 104.

At a different point in time, the user 112 may initiate a contactless transaction by holding the portable device 102 close to the access device 106 so that communications under the first communication protocol may be exchanged between the portable device 102 and the access device 106 over NFC. In this instance, the access device 106 may determine that the portable device 102 and the remote computer 108 use compatible communication protocols (e.g., both use the same communication protocol). Thus, as communications under the first communication protocol are exchanged between the portable device 102 and the access device 106, the access device 106 may forward communications received from the portable device 102 to the remote computer 108 without performing a conversion. Likewise, when communications are received from the remote computer 108, the access device 106 may forward the communications to the portable device 102 without performing a conversion. In some embodiments, the access device 106 may wrap communications exchanged between the portable device 102 and the remote computer 108.

In some embodiments, the first communication protocol may correspond to the Europay Master Visa (EMV) second generation standard (EMV 2.0) while the second communication protocol may correspond to the EMV first generation standard (EMV 1.0). Each EMV standard is associated with a number of payment schemes. Each payment scheme in EMV 1.0 defines its own payment processing module, where each module includes functions, logic, or data used for handling contact or contactless transactions performed using the associated payment scheme. In processing a transaction, a POS terminal would need to identify which payment processing module is to be used and then let that module take over the exchange of commands with the portable device (where the commands are sent via the exchanged communications and the commands include data). EMV 1.0 may be a stateful communication protocol. Stated another way, EMV 1.0 payment processing modules may expect commands to be exchanged in a particular sequence.

EMV 2.0 may be a stateless data driven communication protocol that may be associated with a single processing module that can handle different schemes. In general however, a POS terminal that is configured to handle EMV 2.0 transactions may be unable to handle EMV 1.0 transactions. Rather than have a merchant operate a first POS terminal for EMV 1.0 transactions and a second POS terminal for EMV 2.0 transactions, some embodiments may allow the merchant to operate a single physical card reader (i.e., the access device 106) that is capable of handling any payment scheme associated with the EMV 1.0 communication protocol or the EMV 2.0 communication protocol. The card reader may be communicatively coupled to a PA in the cloud (i.e., the remote computer 108) that handles payment processing over a single communication protocol (e.g., the first communication protocol).

Thus, in response to the initiation of a transaction by a credit/debit card, the card reader may be responsible for identifying the communication protocol (e.g., EMV 1.0 or EMV 2.0), the payment scheme, and/or the payment processing module to use based on the credit card. If the identified communication protocol, payment scheme, or processing module is not compatible with the PA in the cloud, the card reader will translate or convert communications from the card into a format that is compatible with the PA in the cloud. Meanwhile, the PA in the cloud may be responsible for processing the payment based on the converted/translated communications. In this regard, the card reader may be referred to as a thin client. The resulting separation of concerns may result in a plurality of modularized components (e.g., the thin client and the PA in the cloud) comprising software that is, as a whole, less complex than (1) that of a single component (e.g., a single local POS terminal, where a local POS terminal is a complete PA system that is fully contained within a brick-and-mortar store) that is configured to process payments using any communication protocol or (2) that of multiple local POS' terminals (e.g., a first POS terminal to handle EMV 1.0 transactions and a second POS terminal to handle EMV 2.0 transactions).

In some embodiments, EMV 2.0 may be based on REST or JSON. For example, communications adhering to EMV 2.0 may be formatted in XML or JSON and such communications may be transmitted and/or received from a REST interface.

In general, updates to payment processing logic may be more common than updates to communication protocols. Accordingly, relocating the payment processing software from local POS terminals to the PA in the cloud may make it easier to update payment processing logic because the payment processing network operator would no longer need to update local POS terminals (e.g., by physically accessing card readers to perform any updates).

The area 150 may correspond to a physical location of a resource provider (e.g., a brick-and-mortar store) where the portable devices 102-104 are placed in close proximity to (e.g., a few inches or feet from) the access device 106 to perform transactions. However, the setup depicted in FIG. 1 is not intended to be limiting. In other embodiments, for example, the portable devices 102-104 may be located remotely from the access device 106.

The access device 106 may correspond to one or more access devices located at the resource provider location. For example, the access device 106 may be a physical card reader used for extracting transaction information from credit cards or debit cards used by customers at a store. The card reader may act as a thin client that is connected to the remote computer 108 through the Internet (e.g., where the card reader is connected to the Internet (i.e., the communication network 120) via a Wi-Fi connection or an Ethernet connection). In general, the access device 106 may provide a unified transaction interface that enables the remote computer 102 to conduct transactions with a wider variety of portable devices. In comparison to local PA systems, some embodiments may separate PA functionality between two physically-decoupled devices: the access device 106 and the remote computer 108. In particular, the access device 106 may include logic for communicating with portable devices over various communication protocols, managing state and/or flow (e.g., for stateful communication protocols), and converting communications from one protocol to another. It should be noted that the state or flow of a stateful communication protocol may affect how information is communicated using the stateful communication protocol. In particular, the state or flow of a stateful communication protocol may specify the number of commands to be sent, the sequence of the commands, and what data is carried in which commands. The access device 106 is discussed in further detail below with respect to FIG. 3.

The remote computer 108, which can correspond to a cloud based system or one or more server computer systems that are remotely located with respect to area 150, may include logic for conducting transactions (e.g., payment processing logic) with portable devices. In some embodiments, the remote computer 108 may host a payment processing module that is referred to as the "PA in the cloud." In particular, the PA in the cloud may be a unified payment processing module capable of handling transactions performed using one or more payment schemes under EMV 2.0. The remote computer 108 is discussed in further detail below with respect to FIG. 2

The portable devices 102-104 may each be a portable device as defined above, where the portable device 102 is configured to perform transactions using the first communication protocol while the portable device 104 is configured to perform transactions using the second communication protocol. For example, the portable device 102 may be a newer type of credit card or debit card that is compatible with EMV 2.0 while the portable device 104 may be an older type of credit card or debit card that is compatible with EMV 1.0.

The access device 106 and the remote computer 108 may be communicatively coupled to the communication network 120. The communication network 120 can be of any type and can include one or more communication networks. Examples of the communication network 120 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network 120 may include any communication network or infrastructure that facilitates communications between computing devices.

Figure 2:
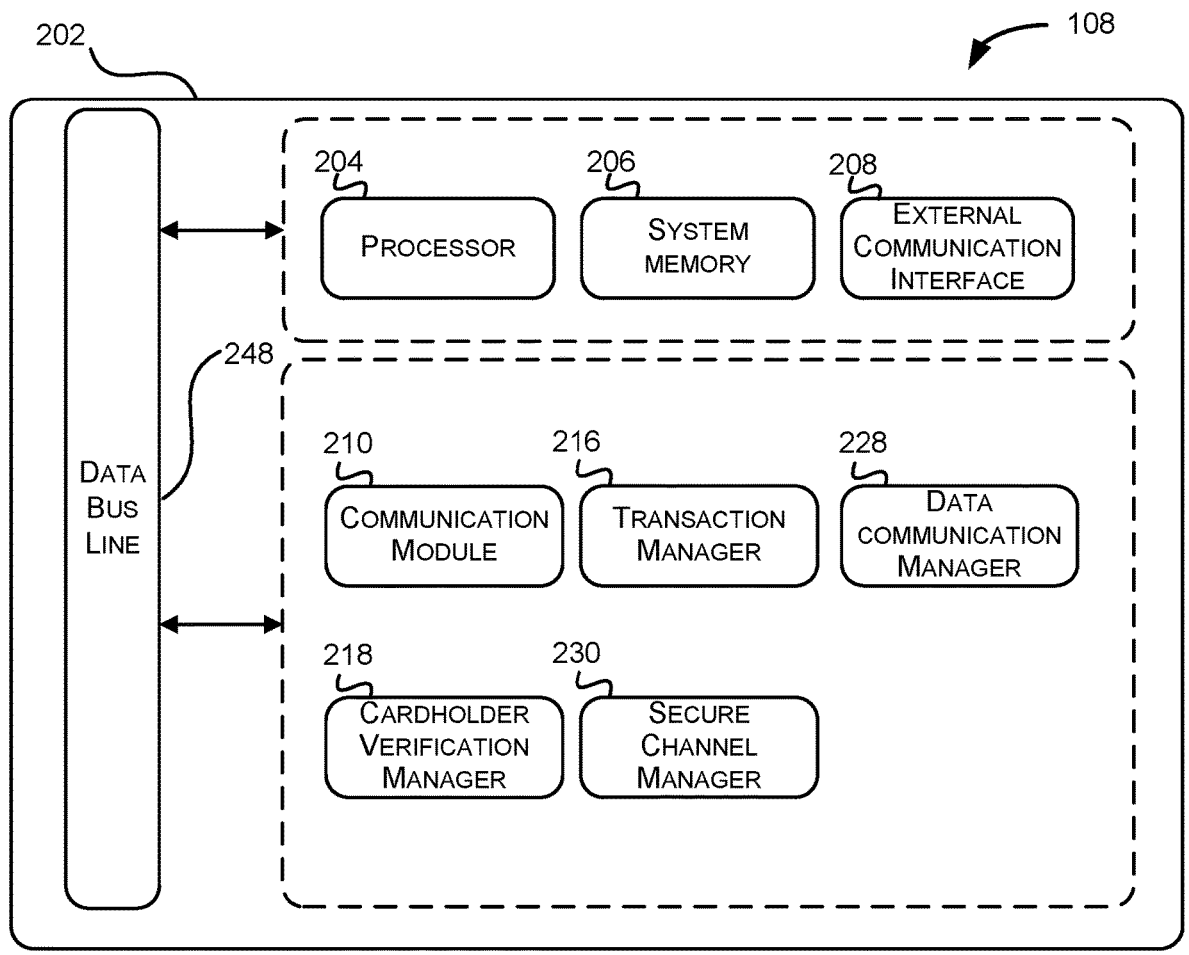
FIG. 2 depicts a block diagram of a remote computer in accordance with some embodiments.

FIG. 2 illustrates a block diagram of the remote computer 108 including an exemplary server computer 202 in accordance with embodiments. The server computer 202 is illustrated as comprising a plurality of hardware and software modules (204-230). However, it should be appreciated that this is provided for illustration purposes only, and each of the modules and associated functionality may be provided and/or performed by the same or different components. That is, the server computer 202 may perform some of the relevant functions and steps described herein with reference to the remote computer 108 through the use of any suitable combination of software instructions and/or hardware configurations. It should be noted that although FIG. 2 (and other system described herein) illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The server computer 202 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of the modules 210-220 may be disposed within one or more of the components of the system memory 206, or may be disposed externally. As was noted above, the software and hardware modules shown in FIG. 2 (and other systems described herein) are provided for illustration purposes only, and the configurations are not intended to be limiting. The processor 204, system memory 206 and/or external communication interface 208 may be used in conjunction with any of the modules described below to provide a desired functionality. Some exemplary modules and related functionality may be as follows:

A communication module 210 may be configured or programmed to perform some or all of the functionality associated with receiving, sending, and generating electronic messages for transmission at the remote computer 108 to or from any of the entities shown in FIG. 2. When an electronic message is received by the server computer 202 via the external communication interface 208, it may be passed to the communication module 210. The communication module 210 may identify and parse the relevant data based on a particular messaging protocol used in the remote computer 108. The communication module 210 may then transmit any received information to an appropriate module within the server computer 202 (e.g., via a data bus line 248). The communication module 210 may also receive information from one or more of the modules in the server computer 202 and generate an electronic message in an appropriate data format in conformance with a transmission protocol used in the remote computer 108 so that the message may be sent to one or more entities within system 100 (e.g., to the access device 106). The electronic message may then be passed to the external communication interface 208 for transmission.

A data communication manager 228 may be programmed and/or configured to perform functionality associated with (1) preparing and managing the list of data objects requested by the transaction processing module and providing the requested data objects received from the portable device, and (2) managing and responding to the portable device's data objects requests by populating the message sent to the access device with corresponding data objects obtained from the transaction processing module.

In particular, the transaction processing module may inform the data communication manager 228 about its data request statuses. If transaction processing module needs data from the portable device, the data communication manager list may include the corresponding data identifiers. Otherwise, the data communication manager list may be empty. Meanwhile, the portable device may inform the data communication manager 228 about its data requests status. If the portable device requests data from the remote computer, the portable device list may include the corresponding data identifiers. If the portable device has no immediate data request, the portable device list may be empty. Additionally, the portable device may provide data objects that the data communication manager requested.

The data communication manager may synchronize the exchange of data between the portable device and the remote computer 108 in order to optimize performance and minimize the number of communications exchanged with the portable device. Additionally, the data manager may request the secure channel manager 230 to send secured communications to the portable device. When a communication channel is established with the portable device, the portable device and/or the transaction processing module may inform the data communication manager 228 of their security level preferences, hence directing the data communication manager 228 to interact accordingly with the secure channel manager 230.

The secure channel manager 230 may be programmed and/or configured to perform functionality associated with securing data exchanges with the portable device in a way that is transparent to the data communication manager 228 and transaction processing module.

Figure 3:
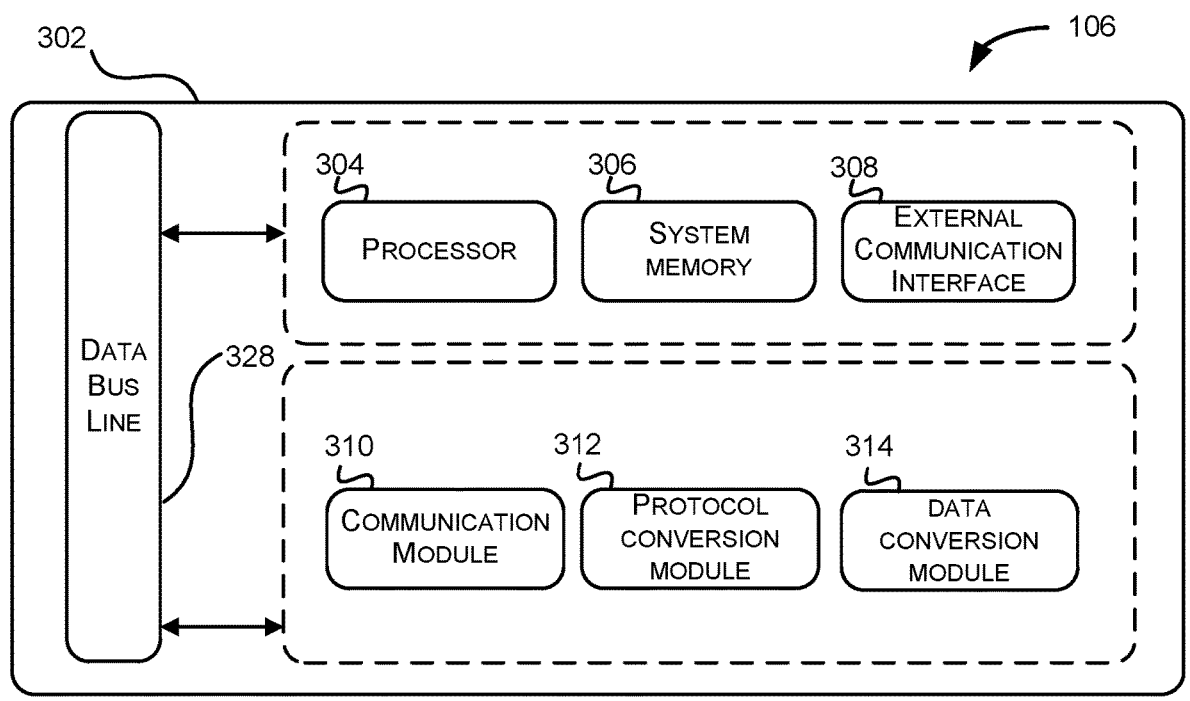
FIG. 3 depicts a block diagram of an access device in accordance with some embodiments.

FIG. 3 illustrates a block diagram of the access device 106 including an exemplary computer 302 in accordance with embodiments. The computer 302 is illustrated as comprising a plurality of hardware and software modules (304-314). However, it should be appreciated that this is provided for illustration purposes only, and each of the modules and associated functionality may be provided and/or performed by the same or different components. That is, the computer 302 may, for instance, perform some of the relevant functions and steps described herein with reference to the access device 106 through the use of any suitable combination of software instructions and/or hardware configurations.

The computer 302 is shown as comprising a processor 304, system memory 306, and an external communication interface 308. Moreover, one or more of the modules 310-314 may be disposed within one or more of the components of the system memory 306, or may be disposed externally. The processor 304, system memory 306 and/or external communication interface 308 may be used in conjunction with any of the modules described below to provide a desired functionality. Some exemplary modules and related functionality may be as follows.

A communication module 310 may be configured or programmed to perform some or all of the functionality associated with receiving, sending, and generating electronic messages for transmission at the access device 106 to or from any of the entities shown in FIG. 3. When an electronic message is received by the computer 302 via the external communication interface 308, it may be passed to the communication module 310. The communication module 310 may identify and parse the relevant data based on a particular messaging protocol used in the access device 106. The communication module 310 may then transmit any received information to an appropriate module within the computer 302 (e.g., via a data bus line 328). The communication module 310 may also receive information from one or more of the modules in the computer 302 and generate an electronic message in an appropriate data format in conformance with a transmission protocol used in the access device 106 so that the message may be sent to one or more entities within system 100 (e.g., to the remote computer 108). The electronic message may then be passed to the external communication interface 308 for transmission.

A communication module 310 may be configured or programmed to perform some or all of the functionality associated with communicating with portable devices. In particular, the communication module 310 may be responsible for (1) establishing, maintaining, and terminating a session with a portable device, (2) allowing the exchange of messages within a given session, (3) and allowing multiple sessions to coexist. The protocol conversion module 312 may be configured or programmed to perform some or all of the functionality associated with converting communications sent between portable devices and the remote computer 108 from one communication protocol (e.g., the first communication protocol) to another (e.g., the second communication protocol). The protocol conversion module 312 may be responsible for determining what communication protocol (e.g., EMV 1.0 or EMV 2.0) a particular device is configured to use. Based on this determination, the protocol conversion module 312 may handle the conversion of communications exchanged for a transaction if requested. For example, a communication originating from the portable device 104 may be received by the communication module 310. Based on a determination that the portable device 104 uses the second communication protocol while the remote computer 108 uses the first communication protocol, the protocol conversion module may convert the communication from the second communication protocol to the first communication protocol before forwarding the converted communication to the remote computer 108.

In particular, the protocol conversion module 312 may be responsible for (1) requesting the communication module 310 to establish, maintain, and terminate a session with a portable device, and (2) synchronizing the exchange of messages between the portable device and the remote computer 108 in order to optimize performance and minimize the number of communications exchanged with the remote computer.

In order to do so, the protocol conversion module 312 may be configured or programmed to (1) create, format, and exchange as many messages as necessary within a given session, to fulfill as many as possible data requests from the remote computer and (2) create, format, and exchange as many messages as necessary within a given session, to fulfill as many as possible data requests from the portable device.

The data conversion module 314 may be configured or programmed to perform some or all of the functionality associated with converting data sent between portable devices and the remote computer 108 from one data format (e.g., associated with the first communication protocol) to another (e.g., the format associated with the second communication protocol). The data conversion module 314 may be responsible for determining what communication protocol (e.g., EMV 1.0 or EMV 2.0) a particular portable device is configured to use. Based on this determination, the data conversion module 314 may handle the conversion of data exchanged for a transaction if requested. For example, a communication originating from the portable device 104 may be received by the communication module 310. Based on a determination that the portable device 104 uses the second communication protocol while the remote computer 108 uses the first communication protocol, the data conversion module may convert the data format associated with the second communication protocol to the format appropriate for the first communication protocol before forwarding the converted data to the remote computer 108.

II. Handling Transactions Over a Unified Transaction Interface

Figure 4:
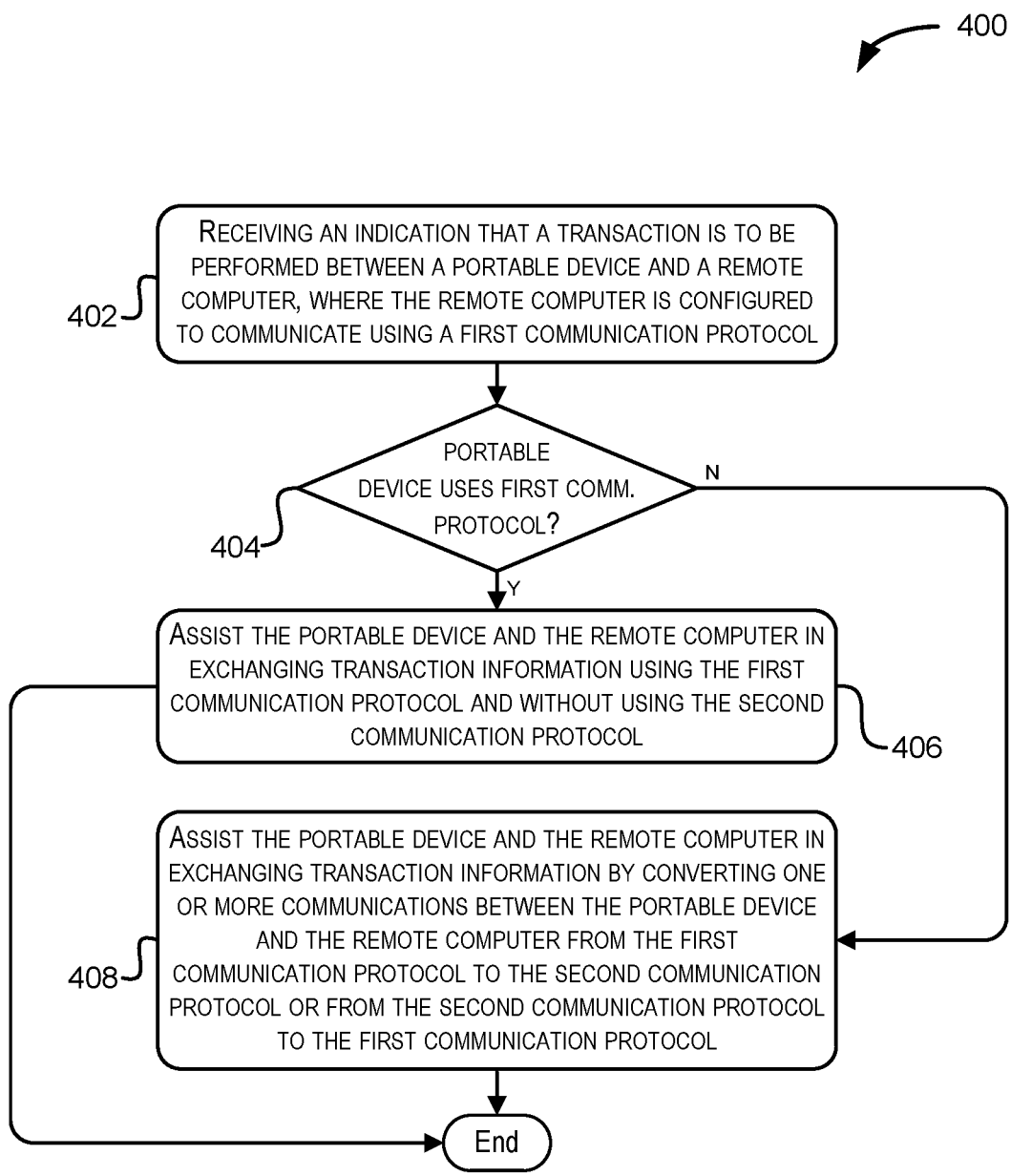
FIG. 4 shows a flowchart illustrating an exemplary method of conducting access transactions using different communication protocols in accordance with some embodiments.

FIG. 4 shows a flowchart illustrating an exemplary method of conducting access transactions using different communication protocols in accordance with some embodiments.

At step 402, an access device receives an indication that a transaction is to be performed between a portable device and a remote computer, where the remote computer is configured to communicate using a first communication protocol. The indication may be generated from a variety of inputs including: inserting the portable device into an interface provided by the access device (e.g., inserting a chip-and-pin card into a card reader), tapping the portable device against the interface (e.g., tapping a mobile phone against a reader), swiping the portable device across the interface (e.g., swiping a credit card against a slot provided by the card reader), pairing the portable device with the access device, having the interface scan the portable device, or having the interface/access device optically read the portable device.

In some embodiments, the first communication protocol may define a first set of communications (e.g., select a first application on the card, provide a first set of data to and request a second set of data from the card) that the access device is configured to exchange with a particular set of portable devices that are configured to communicate using the first communication protocol. For example, the first communication protocol may correspond to EMV 2.0 and the particular set of portable devices that are configured to communicate using the first communication protocol may correspond to a newer type of credit card. In some embodiments, communications may include application layer communications and transport layer communications, where application layer communications define data objects and data flows while transport layer communications define message formats (e.g., TCP/IP, Bluetooth, ISO 7816) regardless of the data being exchanged.

The first communication protocol may further define a second set of communications that the access device is configured to exchange with the remote computer, a fourth set of communications (e.g., a first transaction processing flow) that the remote computer is configured to exchange with the access device, and a fifth set of communications that the access device is configured to exchange with portable devices that are configured to communicate using the first communication protocol.

In embodiments where the access device serves as a simple relay when both the portable device and the remote computer use the same communication protocol, the first set of communications and the second set of communications may be the same. However, some embodiments may have the access device perform transformations on communications to optimize performance and minimize the number of communications exchanged with the remote computer (e.g., wrapping the communications in an object or a wrapping interface) and/or to adapt to specific transport protocols (e.g. TCP/IP, Bluetooth, ISO 7816) even when the portable device and the remote computer use the same communication protocol. In such embodiments, the first set of communications may differ from the second set of communications.

At decision 404, the access device determines whether the portable device is configured to communicate using a first communication protocol or a second communication protocol. In some cases, the first communication protocol is stateless while the second communication protocol is stateful. In some embodiments, the access device may transmit a first communication to the portable device, where the first communication adheres to the first communication protocol. If the portable device provides a response that adheres to the first communication protocol, then the access device may determine that the portable device is configured to communicate using the first communication protocol and the method continues to step 406. On the other hand, if the portable device provides an incorrect response or no response, the access device may determine that the portable device is configured to communicate using the second communication protocol and the method continues to step 408.

In some embodiments, the second communication protocol may define a third set of communications (e.g., select a second application on the card, provide a third set of data to and request a fourth set of data from the card) that the access device is configured to receive from a particular set of portable devices that are configured to communicate using the second communication protocol. For example, the second communication protocol may correspond to EMV 1.0 and the particular set of portable devices that are configured to communicate using the second communication protocol may correspond to an older type of credit card. The second communication protocol may further define a sixth set of communications (e.g., a second transaction processing flow) that the access device is configured to exchange with portable devices that are configured to communicate using the second communication protocol.

In general, the sets of communications may include communications for requesting data, communications for verifying data, communications for sending data.

At step 406, upon determining that the portable device and the remote computer both use the first communication protocol, the access device assists the portable device and the remote computer in exchanging transaction information using the first communication protocol and without using the second communication protocol. In this regard, the access device may exchange the first set of communications with the portable device and, based on the first set of communications, transmit the second set of communications to the remote computer. The access device may also receive the fourth set of communications from the remote computer and, based on the fourth set of communications, transmit the fifth set of communications to the portable device. In some embodiments, the access device may relay communications between the portable device and the remote computer without performing any transformations. In other embodiments, the access device may perform transformations on communications between the portable device and the remote computer.

At step 408, upon determining that the portable device and remote computer use different communication protocols, the access device assists the portable device and the remote computer in exchanging transaction information by converting one or more communications between the portable device and the remote computer from the first communication protocol to the second communication protocol or from the second communication protocol to the first communication protocol. In particular, the access device may obtain the third set of communications from the portable device and, based on the third set of communications, transmit the second set of communications to the remote computer. Additionally, the access device may receive the fourth set of communications from the remote computer and, based on the fourth set of communications, transmit the sixth set of communications to the portable device.

It should be noted that during or after the process of exchanging transaction data between the portable device and the remote computer, one or more authorization request messages may be generated and transmitted to a payment processing network, which may include forwarding the authorization request messages to an acquirer and/or and issuer.

Figure 5:
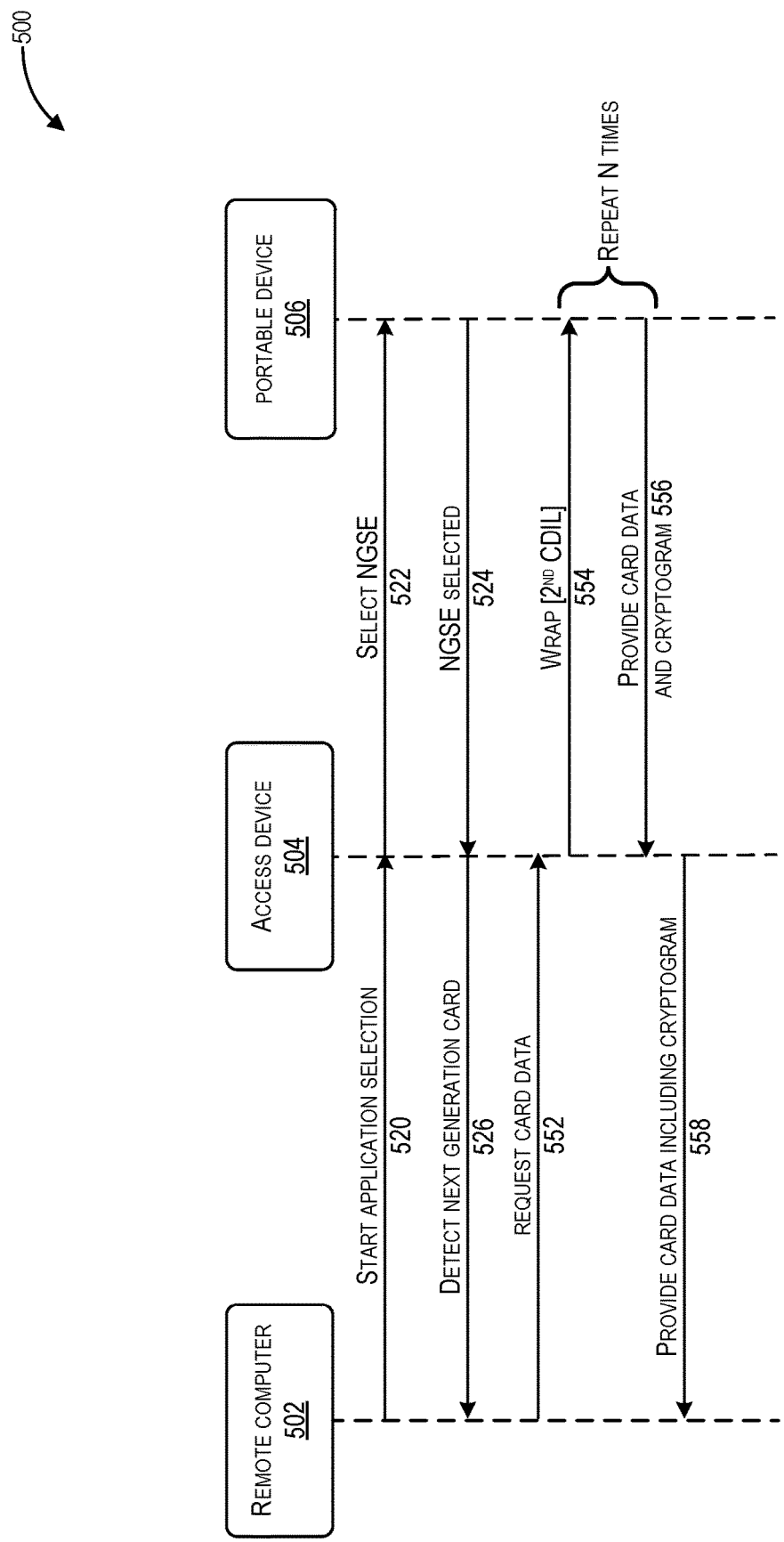
FIGS. 5-6 illustrates a sequence diagram showing operations for conducting access transactions using different communication protocols in accordance with some embodiments.
Figure 6:
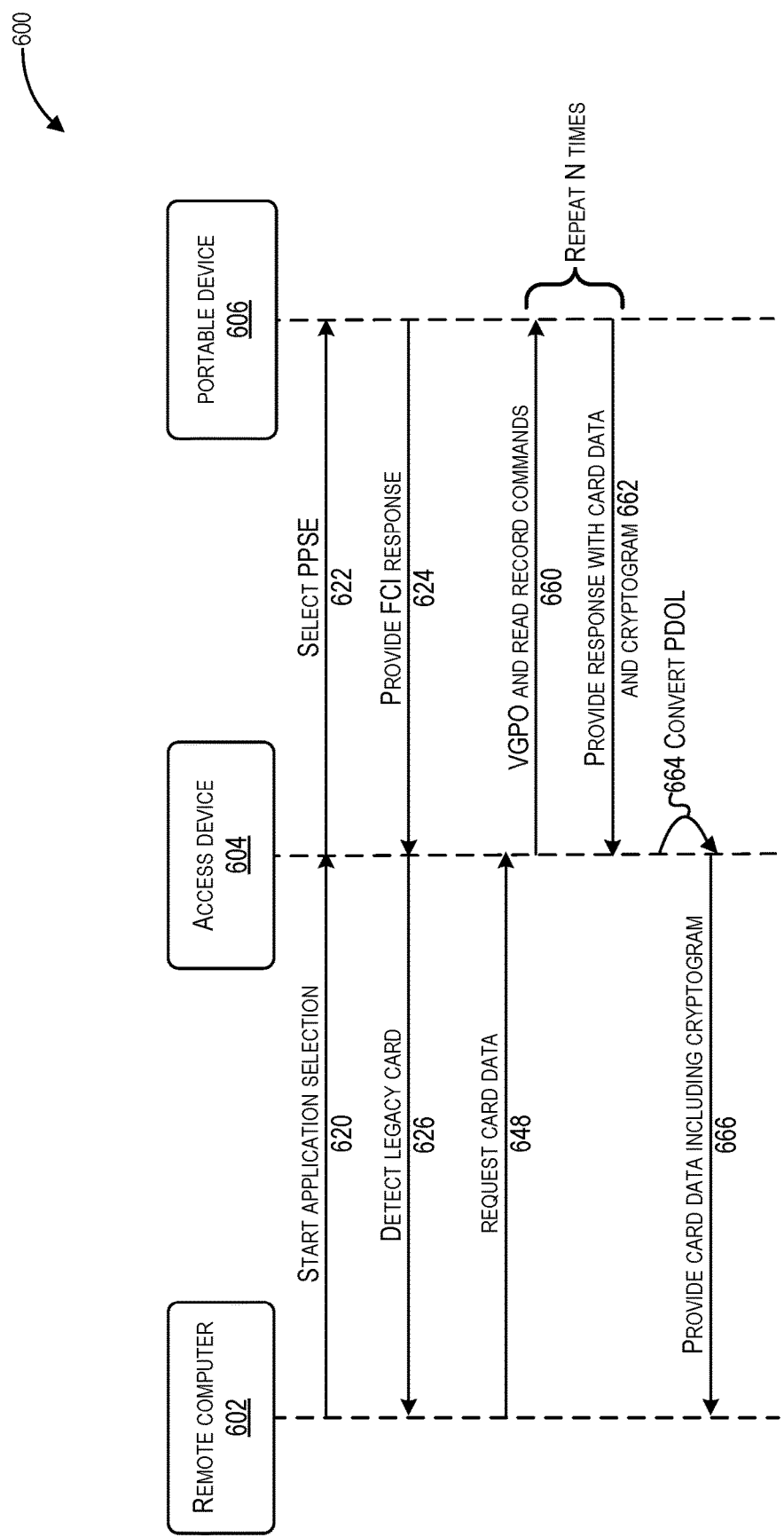

FIGS. 5-6 illustrates a sequence diagram showing operations for conducting transactions using different communication protocols in accordance with some embodiments.

FIG. 5 shows a transaction being conducted between a remote computer configured to use a first communication protocol and a portable device configured to use a first communication protocol. As shown in FIG. 5, system 500 includes a remote computer 502, an access device 504, and a portable device 506. Note that in some embodiments, the remote computer 502, the access device 504, and the portable device 506 may be analogous to the remote computer 108, the access device 106, and the portable device 102, respectively.

At step 520, the access device 504 receives a communication from the remote computer 502 to start the selection of an application with which to perform the transaction. In some embodiments, the access device 504 may have forwarded an indication that a transaction is to be conducted between the remote computer 502 and the portable device 506. The indication may have originated from a physical interaction between the portable device 506 and the access device 504 (e.g., swiping a credit card against a card reader). At this point, the remote computer (i.e., the PA in the cloud) may be determining what applications are available on the portable device 506 to perform the transaction with.

At step 522, the access device 504 forwards the communication in step 520 to the portable device 506 as a "select EMV" command. If a portable device is unable to respond correctly to this command or rejects this command, the access device 504 may determine that the portable device uses the second communication protocol rather than the first communication protocol and may begin communicating with the portable device 506 using the second communication protocol as discussed in further detail with respect to FIG. 6 below.

At step 524, because the portable device 506 uses EMV 2.0, the access device 504 may receive a communication confirming that the portable device 506 uses the first communication protocol. In some embodiments, the portable device response may also include a request for server data from the remote computer 502.

At step 526, the access device 504 forwards the confirmation that the portable device uses the first communication protocol to the remote computer 502 along with any eventual POS data requests from the portable device 506.

Steps 552-558 describe a series of exchanges of transaction information between the remote computer 502 and the portable device 506 that are assisted by the access device 504. To conduct a transaction, the remote computer 502 and the portable device 506 may seek to obtain transaction information from each other. For example, the portable device 506 may wish to know what sort of card verification methods are supported by the remote computer 502. Meanwhile, the remote computer may wish to obtain the primary account number (PAN), expiration date, country code, and other account information associated with portable device 506.

Because EMV 2.0 is a data driven communication protocol, different combinations of card data or POS data can be requested or provided in a single communication. In particular, a single communication may both request data and provide data in response to an earlier request. For example, a communication from the remote computer 502 to the portable device 506 may both include a request for card data and POS data that is responsive to a POS data request made by the portable device 506. This ability to mix and match data and data requests in a single communication may reduce the total number of communications exchanged, which may increase the speed and reduce the complexity of processing the transaction. It should be noted that steps 552-558 may be repeated a number of times depending on the transaction information that needs to be exchanged.

At step 552, the access device 504 may receive, from the remote computer 502, a communication that requests card data from the portable device 506. The communication may additionally include POS data. In some embodiments, the remote computer 502 provides the POS data that was requested by the portable device 506 in step 524. In some embodiments, the remote computer 502 provides to the access device 504 all the POS data that is available at that stage regardless of the portable device data requests.

At step 554, the access device 504 may forward the card data request and the POS data to the portable device 506. In some embodiments, the access device 504 may wrap the card data request in a list of data objects requested from the portable device 506. In some embodiments, the access device 504 may provide only the set of POS data that were requested by the portable device in a previous communication.

At step 556, the access device 504 may receive another communication from the portable device 506 that contains the card data requested in the previous step. In some embodiments, the portable device 506 may provide only the set of card data that were requested in the previous step.

At step 556, the access device 504 may receive a communication from the portable device 506 that requests POS data. In some embodiments, the portable device 506 wrap the POS data request in a list of data objects requested from the remote computer 502.

At step 558, the access device 504 may forward the card data and the POS data requests to the remote computer 502. In some embodiments, the access device 504 may have already received in a previous communication with the remote computer 502 the POS data requested by the portable device 506 and may be able to provide them without additional communications with the remote computer 502. In some embodiments, the access device 504 may only forward to the remote computer 502 the data requests from the portable device 506 for the POS data that it has not yet received.

FIG. 6 shows a transaction being conducted between a remote computer configured to use a first communication protocol (e.g., EMV 2.0) and a portable device configured to use a second communication protocol (e.g., EMV 1.0). As shown in FIG. 6, system 600 includes a remote computer 602, an access device 604, and a portable device 606. Note that in some embodiments, the remote computer 602, the access device 604, and the portable device 606 may be analogous to the remote computer 108, the access device 106, and the portable device 104, respectively.

At step 620, the access device 604 receives a communication from the remote computer 602 to start the selection of an application with which to perform the transaction. At this point, the remote computer may be determining what applications are available on the portable device 606 to perform the transaction with.

At step 622, the access device 604 may convert in step 620 the communication to the portable device 606 and transmit a "select EMV1.0" command to the portable device. In some embodiments, the access device 604 may have transmitted a "select EMV2.0" command to the portable device 606 in an attempt to communicate with the portable device 606 using the first communication protocol (e.g. EMV 2.0). However, because the portable device 606 rejected the "select EMV2.0" command or did not correctly respond, the access device 604 may have fallen back to communicating with the portable device 606 using the second communication protocol (e.g. EMV 1.0).

At step 624, the portable device 606 may respond to the access device 604 it uses the second communication protocol (e.g., EMV 1.0). In some embodiments, the portable device response may also include a request for certain POS data from the remote computer 602. In some embodiments, the portable device POS data requests may be implicit in the second communication protocol and be explicitly constructed by the access device 604.

At step 626, the access device 604 may transmit a communication to the remote computer 602 in the first communication protocol indicating that the portable device 606 uses the second communication protocol (e.g., EMV 1.0) and may have some POS data requests. However, the fact that the portable device 606 does not support the first communication protocol may not change the behavior of the remote computer 602. Rather, the remote computer 602 may rely on the access device 604 to insulate the remote computer 602 from any differences between the first and second communication protocols.

Similar to steps 552-558 in FIG. 5, steps 648-656 describe a series of exchanges of transaction information between the remote computer 602 and the portable device 606 that are assisted by the access device 604. While the transaction information that is exchanged here may bear similarities to the transaction information exchanged in FIG. 5, the formats in which the transaction information is transmitted may differ. In particular, the remote computer 602 may make request card data and provide POS data in a way that adheres to EMV 2.0 while the portable device 606 may request POS data and provide card data in a way that adheres to EMV 1.0. In this regard, the access device 604 may handle the conversion of EMV 2.0 communications to EMV 1.0 communications and the conversion of EMV 1.0 communications to EMV 1.0 communications.

At step 648, the access device 604 may receive, from the remote computer 602, a communication that requests card data requested from the portable device 606. The communication may additionally include some POS data. In some embodiments, the remote computer 602 provides the POS data that was requested by the portable device 606 in step 624. In some embodiments, the remote computer 602 provides to the access device 604 all the POS data that is available at that stage regardless of the portable device data requests.

At step 660, the access device 604 may convert the communication received in the first communication protocol (e.g. EMV 2.0) from the remote computer 602 in step 648 into a communication in the second communication protocol (e.g., EMV 1.0). In some embodiments, the access device 604 may convert all the POS data provided by the remote computer 602 and all the card data requests sought by the remote computer 602. In some embodiments, the access device 604 may only convert the subset of card data requested by the remote computer 602 and only the subset of POS data received that comply to the second communication protocol (e.g., EMV 1.0). The access device 604 may then transmit the EMV 1.0 communication to the portable device 606.

At step 662, the access device 604 may receive a communication in the second communication protocol (e.g., EMV 1.0) from the portable device 606, where the communication includes the requested card data. In some embodiments, the portable device response may also include a request for certain POS data from the remote computer 602.

In some embodiments, the portable device POS data requests may be implicit and be explicitly constructed by the access device 604.

At step 664, the access device 604 may convert the communication received in the second communication protocol (e.g., EMV 1.0), extract the provided card data by the portable device 606 in step 662 and convert the card data into a communication in the first communication protocol (e.g. EMV 2.0). In some embodiments, the access device 604 may not receive in a single communication all the card data requested by the remote computer 602 and may continue exchanging communications with the portable device 606 until all the card data sought by the remote computer 602 are received.

In some embodiments, the portable device response may also include a request for certain POS data from the remote computer 602. In some embodiments, the portable device POS data requests may be implicit and be explicitly constructed by the access device 604.

At step 666, the access device 604 may forward the card data and the POS data requests to the remote computer 602. In some embodiments, the access device 604 may have already received in a previous communication with the remote computer 602 requested the POS data and may be able to provide them without additional communications with the remote computer 602. In some embodiments, the access device 604 may only forward to the remote computer 602 the data requests for the POS data that it has not yet received.

The various participants and elements described herein with reference to FIGS. 1-6 may operate one or more computer apparatuses to facilitate the functions described herein. Any of the elements in FIGS. 1-6, including any servers or databases, may use any suitable number of subsystems to facilitate the functions described herein.

In FIGS. 5-6, after data is exchanged between the remote computers 502, 602, and the portable device 506, 606, an authorization request message may be generated by the remote computers 502, 602. An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

The authorization request message may be transmitted to an issuer computer via an acquirer computer and a payment processing network. The issuer computer may approve or deny the transaction, and may generate an authorization response message. An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant. The authorization response message may be transmitted back to the remote computers 502, 602 via the payment processing network and the acquirer computer. The remote computers 502 may further transmit the authorization response message back to the access device.

Examples of such subsystems or components are interconnected via a system bus. Additional subsystems such as a printer, keyboard, fixed disk (or other memory comprising computer readable media), monitor, which is coupled to a display adapter, and others are shown. Peripherals and input/output (I/O) devices, which couple to I/O controller (which can be a processor or other suitable controller), can be connected to the computer system by any number of means known in the art, such as a serial port. For instance, serial port or an external interface can be used to connect computer apparatus to a wide area network such as the Internet, a mouse input device, or a scanner. The interconnection via system bus allows a central processor to communicate with each subsystem and to control the execution of instructions from a system memory or fixed disk, as well as the exchange of information between subsystems. System memory and/or fixed disk may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
  receiving, by an access device from a portable device proximate to the access device, an indication that a transaction is to be performed by exchanging transaction information between the portable device and a remote computer operating in a cloud computing environment, the remote computer being configured to perform point of sale terminal processing and to communicate using a first communication protocol, the portable device and the remote computer being configured to request data from one another through the access device, the access device providing a unified interface that enables the remote computer to conduct transactions with a variety of portable devices that utilize a variety of corresponding communications protocols;
  determining, by the access device, that the portable device is configured to communicate using a second communication protocol;
  converting, by the access device, a request for card data received from the remote computer from the first communication protocol to the second communication protocol;
  transmitting, by the access device to the portable device, the request for the card data as converted;
  converting, by the access device, the card data received from the portable device from the second communication protocol to the first communication protocol; and
  transmitting to the remote computer, the card data as converted, wherein the remote computer generates and transmits an authorization request message for the transaction to a resource provider computer based at least in part on receiving the card data as converted.

2. The method of claim 1:
  wherein the first communication protocol defines:
    a first set of communications that the access device is configured to receive from a first plurality of portable devices that are configured to communicate using the first communication protocol; and
    a second set of communications that the access device is configured to transmit to the remote computer;
  wherein the second communication protocol defines a third set of communications that the access device is configured to receive from a second plurality of portable devices that are configured to communicate using the second communication protocol; and
  wherein converting communications between the portable device and the remote computer from the second communication protocol to the first communication protocol comprises obtaining the third set of communications from the portable device and, based on the third set of communications, transmitting the second set of communications to the remote computer.

3. The method of claim 2, wherein the transaction is a first transaction, the transaction information is first transaction information, and the portable device is a first portable device; and
  wherein the method further comprises:
    receiving, from a second portable device or the remote computer, another indication that a second transaction is to be performed by exchanging second transaction information between a second portable device and the remote computer, the second portable device and the remote computer being configured to request second data from one another through the access device;
    determining that the second portable device is configured to communicate using the first communication protocol;
    assisting the remote computer in requesting second card data from the second portable device through the access device; and
    assisting the second portable device to transmit the second card data to the remote computer via the access device,
    wherein receiving the second card data by the remote computer causes the remote computer to generate and transmit a second authorization request message for the second transaction to a second resource provider computer.

4. The method of claim 3, wherein assisting the second portable device and the remote computer uses the first communication protocol and not the second communication protocol, and wherein assisting the portable device comprises obtaining the first set of communications from the portable device and, based on the first set of communications, transmitting the second set of communications to the remote computer.

5. The method of claim 2:
  wherein the first communication protocol further defines:
    a fourth set of communications that the remote computer is configured to transmit to the access device; and
    a fifth set of communications that the access device is configured to transmit to the first plurality of portable devices that are configured to communicate using the first communication protocol;
  wherein the second communication protocol further defines a sixth set of communications that the access device is configured to transmit to the second plurality of portable devices that are configured to communicate using the second communication protocol; and
  wherein converting the communications between the portable device and the remote computer from the second communication protocol to the first communication protocol further comprises receiving the fourth set of communications from the remote computer and, based on the fourth set of communications, transmitting the sixth set of communications to the portable device.

6. The method of claim 5, wherein the first set of communications, the second set of communications, the fourth set of communications, and the fifth set of communications are formatted in XML or JSON.

7. The method of claim 5, wherein the first set of communications, and the fifth set of communications are formatted in XML or JSON or ISO 7816 while the second set of communications and the fourth set of communications are formatted in XML or JSON.

8. The method of claim 1, wherein the remote computer is located remotely from the access device and communicates with the access device over a network, and wherein the access device operates as a thin client.

9. The method of claim 1, wherein the indication is received from the portable device when the portable device is:
inserted into an interface provided by the access device;
tapped against the interface;
paired with the access device;
scanned by the interface; or
optically read.

10. The method of claim 1, wherein the method further comprises converting other communications between one or more other portable devices and the remote computer from one or more other communication protocols to the first communication protocol to assist the one or more other portable devices and the remote computer in exchanging other transaction information.

11. An access device comprising:
a processor, and
a computer-readable medium coupled to the processor, the computer-readable medium storing one or more instructions that, upon execution by the processor, cause the processor to perform operations for:
providing a unified interface that enables a remote computer operating in a cloud computing environment to conduct transactions with a variety of portable devices that utilize a variety of corresponding communications protocols;
receiving, from a portable device, an indication that a transaction is to be performed between the portable device and the remote computer, the remote computer being configured to perform point of sale terminal processing and to communicate using a first communication protocol, the portable device and the remote computer being configured to request data from one another through the unified interface of the access device;
determining that the portable device is configured to communicate using a second communication protocol;
converting a request for card data received from the remote computer from the first communication protocol to the second communication protocol;
transmitting, to the portable device, the request for the card data as converted;
converting the card data received from the portable device from the second communication protocol to the first communication protocol; and
transmitting, to the remote computer, the card data as converted, wherein the remote computer generates and transmits an authorization request message for the transaction to a resource provider computer based at least in part on receiving the card data as converted.

12. The access device of claim 11:
wherein the first communication protocol defines:
a first set of communications that the access device is configured to receive from a first plurality of portable devices that are configured to communicate using the first communication protocol; and
a second set of communications that the access device is configured to transmit to the remote computer;
wherein the second communication protocol defines a third set of communications that the access device is configured to receive from a second plurality of portable devices that are configured to communicate using the second communication protocol; and
wherein converting communications between the portable device and the remote computer from the second communication protocol to the first communication protocol comprises obtaining the third set of communications from the portable device and, based on the third set of communications, transmitting the second set of communications to the remote computer.

13. The access device of claim 12, wherein the transaction is a first transaction and the portable device is a first portable device; and
wherein the instructions further cause the processor to perform operations for:
receiving, from a second portable device or the remote computer, another indication that a second transaction is to be performed between a second portable device and the remote computer, the second portable device and the remote computer being configured to request second data from one another through the access device;
determining that the second portable device is configured to communicate using the first communication protocol;
assisting the remote computer in requesting second card data from the second portable device through the access device; and
assisting the second portable device to transmit the second card data to the remote computer via the access device,
wherein receiving the second card data by the remote computer causes the remote computer to generate and transmit a second authorization request message for the second transaction to a second resource provider computer.

14. The access device of claim 13, wherein assisting the second portable device and the remote computer uses the first communication protocol and not the second communication protocol, and wherein assisting the portable device comprises obtaining the first set of communications from the portable device and, based on the first set of communications, transmitting the second set of communications to the remote computer.

15. The access device of claim 12:
wherein the first communication protocol further defines:
a fourth set of communications that the remote computer is configured to transmit to the access device; and
a fifth set of communications that the access device is configured to transmit to the first plurality of portable devices that are configured to communicate using the first communication protocol;
wherein the second communication protocol further defines a sixth set of communications that the access device is configured to transmit to the second plurality of portable devices that are configured to communicate using the second communication protocol; and wherein converting the communications between the portable device and the remote computer from the second communication protocol to the first communication protocol further comprises receiving the fourth set of communications from the remote computer and, based on the fourth set of communications, transmitting the sixth set of communications to the portable device.

16. The access device of claim 11, wherein the indication is received from the portable device when the portable device is:

inserted into an interface provided by the access device;
tapped against the interface;
paired with the access device;
scanned by the interface; or
optically read.

17. A portable device comprising:

a processor, and a computer-readable medium coupled to the processor, the computer-readable medium storing one or more instructions that, upon execution by the processor, cause the processor to perform operations for:

providing, to an access device, an indication that a transaction is to be performed by exchanging transaction information between the portable device and a remote computer operating in a cloud computing environment, the access device providing a unified interface that enables the remote computer to conduct transactions with a variety of portable devices that utilize a variety of corresponding communications protocols, the remote computer being configured to perform point of sale terminal processing and to communicate using a first communication protocol and the portable device and the remote computer being to request data from one another through the access device, the portable device being further configured to communicate using a second communication protocol; and exchanging transaction information with the remote computer via one or more requests communicated via the access device, wherein the access device converts a first request between the portable device and the remote computer from the second communication protocol to the first communication protocol and a second request between the portable device and the remote computer from the first communication protocol to the second communication protocol, wherein exchanging the transaction information causes the remote computer to generate and transmit an authorization request message for the transaction.

18. The access device of claim 11, wherein the access device operates as a thin client.

19. The method of claim 1, further comprising:

receiving, by the access device from the remote computer, a command to start application selection;

converting, by the access device, the command to start application selection from the first communication protocol to the second communication protocol;

transmitting, by the access device to the portable device, the command to start application selection as converted;

receiving, by the access device from the portable device, a response message;

converting, by the access device, the response message from the second communication protocol to the first communication protocol, the response message comprising an indication of a request for server data; and transmitting, to the remote computer, the response message as converted.

20. The method of claim 1, wherein the first communications protocol is a stateless protocol and the second communications protocol is a stateful protocol, and wherein the method further comprises:

maintaining, by the access device, a state associated with the second communications protocol, wherein the access device is configured to affect a sequence of message transmissions according to the stateful protocol and the state maintained at the access device.

* * * * *